(12) United States Patent
Lim et al.

(10) Patent No.: US 8,922,547 B2
(45) Date of Patent: Dec. 30, 2014

(54) 3D MODEL SHAPE TRANSFORMATION METHOD AND APPARATUS

(75) Inventors: Seong-Jae Lim, Gwangju (KR);
Han-Byul Joo, Daejeon (KR);
Seung-Uk Yoon, Bucheon-si (KR);
Ji-Hyung Lee, Daejeon (KR); Bon-Ki Koo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 162 days.

(21) Appl. No.: 13/335,055

(22) Filed: Dec. 22, 2011

(65) Prior Publication Data

US 2012/0162217 A1    Jun. 28, 2012

(30) Foreign Application Priority Data

Dec. 22, 2010 (KR) .................. 10-2010-0132862
Jun. 30, 2011 (KR) .................. 10-2011-0065053

(51) Int. Cl.
*G06T 15/00* (2011.01)
*G06T 15/20* (2011.01)
*G06T 19/00* (2011.01)

(52) U.S. Cl.
CPC ............ *G06T 15/205* (2013.01); *G06T 19/00* (2013.01)
USPC .......................................... 345/419

(58) Field of Classification Search
None
See application file for complete search history.

(56) References Cited

U.S. PATENT DOCUMENTS

| | | | | |
|---|---|---|---|---|
| 5,506,785 A * | 4/1996 | Blank et al. | ..................... | 700/98 |
| 5,818,452 A * | 10/1998 | Atkinson et al. | .............. | 345/420 |
| 6,100,893 A * | 8/2000 | Ensz et al. | .................... | 345/420 |
| 6,133,921 A * | 10/2000 | Turkiyyah et al. | ............ | 345/420 |
| 6,326,972 B1 * | 12/2001 | Buhler et al. | ................. | 345/474 |
| 6,414,684 B1 * | 7/2002 | Mochizuki et al. | ........... | 345/473 |
| 6,546,309 B1 * | 4/2003 | Gazzuolo | ...................... | 700/132 |
| 6,608,627 B1 * | 8/2003 | Marshall et al. | .............. | 345/619 |
| 6,816,607 B2 * | 11/2004 | O'Donnell et al. | ........... | 382/131 |
| 7,292,250 B2 * | 11/2007 | Sepulveda | ..................... | 345/473 |
| 7,339,586 B2 * | 3/2008 | Guhring | ........................ | 345/424 |
| 7,739,086 B2 * | 6/2010 | Hayashi et al. | .................... | 703/6 |
| 7,782,324 B2 * | 8/2010 | Goldfarb | ....................... | 345/473 |
| 7,928,985 B2 * | 4/2011 | Goldfarb | ....................... | 345/473 |
| 8,269,778 B1 * | 9/2012 | Baraff et al. | .................. | 345/473 |
| 8,405,664 B1 * | 3/2013 | Pighin et al. | .................. | 345/473 |
| 8,462,198 B2 * | 6/2013 | Lin et al. | ......................... | 348/43 |

(Continued)

OTHER PUBLICATIONS

Lawson Wade, Automated Generation of Control Skeletons for Use in Animation, 2000, Ohio State University.*

(Continued)

*Primary Examiner* — Said Broome
*Assistant Examiner* — Charles L Beard
(74) *Attorney, Agent, or Firm* — Staas & Halsey LLP

(57) ABSTRACT

Disclosed herein is a 3D model shape transformation apparatus. The 3D model shape transformation apparatus includes a camera unit, a shape restoration unit, a skeleton structure generation unit, and a skeleton transformation unit. The camera unit obtains a plurality of 2D images in a single frame by capturing the shape of an object. The shape restoration unit generates a 3D volume model by restoring the shape of the object based on the plurality of 2D images. The skeleton structure generation unit generates the skeleton structure of the 3D volume model. The skeleton transformation unit transforms the size and posture of the 3D volume model into those of a template model by matching the skeleton structure of the template model with the skeleton structure of the 3D volume model.

9 Claims, 10 Drawing Sheets

(56) References Cited

U.S. PATENT DOCUMENTS

| | | | |
|---|---|---|---|
| 2002/0080139 A1* | 6/2002 | Koo et al. | 345/473 |
| 2002/0172407 A1* | 11/2002 | O'Donnell et al. | 382/131 |
| 2004/0095385 A1* | 5/2004 | Koo et al. | 345/757 |
| 2005/0093858 A1* | 5/2005 | Tsai et al. | 345/419 |
| 2006/0066469 A1* | 3/2006 | Foote et al. | 342/22 |
| 2006/0109274 A1* | 5/2006 | Alvarez et al. | 345/473 |
| 2006/0126929 A1* | 6/2006 | Kim et al. | 382/154 |
| 2006/0152506 A1* | 7/2006 | Chu et al. | 345/423 |
| 2007/0299353 A1* | 12/2007 | Harlev et al. | 600/509 |
| 2008/0071507 A1* | 3/2008 | Hodgins et al. | 703/6 |
| 2008/0100622 A1* | 5/2008 | Gordon | 345/427 |
| 2008/0309664 A1* | 12/2008 | Zhou et al. | 345/420 |
| 2009/0073259 A1* | 3/2009 | Hernandez et al. | 348/48 |
| 2009/0118600 A1* | 5/2009 | Ortiz et al. | 600/306 |
| 2009/0213123 A1* | 8/2009 | Crow | 345/473 |
| 2009/0232353 A1* | 9/2009 | Sundaresan et al. | 382/103 |
| 2009/0284529 A1* | 11/2009 | De Aguiar et al. | 345/420 |
| 2010/0111370 A1* | 5/2010 | Black et al. | 382/111 |
| 2010/0156901 A1* | 6/2010 | Park et al. | 345/420 |
| 2010/0156935 A1* | 6/2010 | Lim et al. | 345/647 |
| 2010/0158354 A1* | 6/2010 | Kim et al. | 382/154 |
| 2011/0107270 A1* | 5/2011 | Wang et al. | 715/850 |
| 2011/0148864 A1* | 6/2011 | Lee et al. | 345/419 |
| 2011/0148865 A1* | 6/2011 | Lim et al. | 345/419 |
| 2011/0148866 A1* | 6/2011 | Chu et al. | 345/419 |
| 2011/0148874 A1* | 6/2011 | Cha et al. | 345/420 |
| 2011/0148875 A1* | 6/2011 | Kim et al. | 345/420 |
| 2011/0190625 A1* | 8/2011 | Harlev et al. | 600/424 |
| 2011/0206260 A1* | 8/2011 | Bergmans et al. | 382/131 |
| 2012/0147004 A1* | 6/2012 | Choi et al. | 345/420 |
| 2012/0162218 A1* | 6/2012 | Kim et al. | 345/420 |
| 2012/0163675 A1* | 6/2012 | Joo et al. | 382/107 |
| 2012/0163733 A1* | 6/2012 | Yoon et al. | 382/286 |
| 2013/0127853 A1* | 5/2013 | Corazza et al. | 345/420 |

OTHER PUBLICATIONS

Wang, Parameterization and parametric design of mannequins, 2005.*
Thalmann, Human Skin Deformation from Cross-sections, 1998.*
Lu, Atlas-Based Character Skinning with Automatic Mesh Decomposition, 2008.*
Rasmussen, An Analytical Framework for the Preparation and Animation of a Virtual Mannequin for the Pupose of Mannequin-Clothing Interaction Modeling, 2008.*
Ju, Automatic Segmentation of 3D Human Body Scans, 2000.*
Lee, Generating Animatable 3D Virtual Humans from Photograph, 2000.*
Au, Skeleton Extraction by Mesh Contraction, 2008.*
Barthel, 3D-Data Representation with ImageJ, 2006.*
Brice, Human model and pose Reconstruction from Mulit-views, 2005.*
Chang, Skeleon-driven Animation Transfer based on consistent Volume Parameterization, 2006.*
Tagliasacchi, Curve Skeleton Extraction from Incomplete Point Cloud, 2009.*
Cornea , 3D Object Retrieval using Many-to-many Matching of Curve Skeletons, 2005.*
Zollei,2D-3D Rigid-Body Registration of X-Ray Fluoroscopy and CT Images, 2001.*
Ilya Baran et al., "Automatic Rigging and Animation of 3D Characters", ACM SIGGRAPH Conference Proceedings, 2007, pp. 1-8.
Brett Allen et al., "The Space of human body shapes: reconstruction and parameterization from range scans", ACM SIGGRAPH, 2003, pp. 1-8.

* cited by examiner ived using the above-described methods have the problems in that the shapes thereof cannot be transformed, and the appearances thereof are neither natural nor realistic, so that such a model has to be post-processed by specialists such as skilled designers. Further, there is the problem of having to generate a skeleton structure, in which the shape of a restored model can be transformed and in which information about the motion of the restored model can be included, in order to transform the shape of the restored model.

3D MODEL SHAPE TRANSFORMATION METHOD AND APPARATUS

CROSS REFERENCE TO RELATED ED APPLICATIONS

This application claims the benefit of Korean Patent Application Nos. 10-2010-0132862 and 10-2011-0065053, filed on Dec. 22, 2010 and Jun. 30, 2011, respectively, which are hereby incorporated by reference in its entirety into this application.

BACKGROUND OF THE INVENTION

1. Technical Field

The present invention relates generally to a 3-dimensional (3D) model shape transformation method and apparatus. More particularly, the present invention relates to a 3D model shape transformation method and apparatus which can express the appearance and motion of an object having a skeleton structure.

2. Description of the Related Art

Conventionally, 3D models have been generated in such a way as to scan information about the appearance of an object using an active sensor which uses laser light or a pattern of light in order to restore the appearance of the object, or 3D models have been generated in such a way as to restore information about images input by cameras.

However, the models restored using the above-described methods have the problems in that the shapes thereof cannot be transformed, and the appearances thereof are neither natural nor realistic, so that such a model has to be post-processed by specialists such as skilled designers. Further, there is the problem of having to generate a skeleton structure, in which the shape of a restored model can be transformed and in which information about the motion of the restored model can be included, in order to transform the shape of the restored model.

Further, the conventional technology used to generate object models has been used to generate a stick model that only expresses the skeleton of an object, a surface model that expresses the appearance of an object using surface patches, and a volume model that expresses an object using a combination of spheres, cylinders, and ellipses.

The problems of the models that are generated based on such conventional object model generation technology are that a realistic appearance cannot be expressed, that the shape cannot be naturally changed according to the motion of an object and a large amount of calculation time is required to transform the shape, and that a user should manually manipulate the model.

Further, when the appearance is restored using information about the locations of markers attached to a dynamic object, there are problems in that a large amount of markers should be attached to the dynamic object, an expensive motion capture apparatus should be provided, and the markers should be manually detected.

SUMMARY OF THE INVENTION

Accordingly, the present invention has been made keeping in mind the above problems occurring in the prior art, and an object of the present invention is to provide a 3D model shape transformation method and apparatus, which can express the appearance and motion of an object having a skeleton structure.

In order to accomplish the above object, the present invention provides a 3-dimensional (3D) model shape transformation method, including generating a volume model, in which the shape of an object is restored, based on a plurality of 2D images of the object; generating the skeleton structure of the volume model using boundary points between the portions of the body of the volume model; generating a skeleton transformation model by transforming a skeleton structure of a template model into the skeleton structure of the volume model in order to match the size and the posture of the template model with a size and a posture of the volume model; and generating a shape transformation model corresponding to the shape of the object by transforming the appearance of the skeleton transformation model based on the cross-sections of the volume model in order to match the appearance of the skeleton transformation model with the appearance of the volume model.

In order to accomplish the above object, the present invention provides a 3D model shape transformation apparatus including a camera unit, a shape restoration unit, a skeleton structure generation unit, and a skeleton transformation unit. The camera unit may obtain a plurality of 2D images in a single frame by capturing the shape of an object. The shape restoration unit may generate a 3D volume model by restoring the shape of the object based on the plurality of 2D images. The skeleton structure generation unit may generate the skeleton structure of the 3D volume model. The skeleton transformation unit may transform the size and posture of the 3D volume model into those of a template model by matching the skeleton structure of the template model with the skeleton structure of the 3D volume model.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
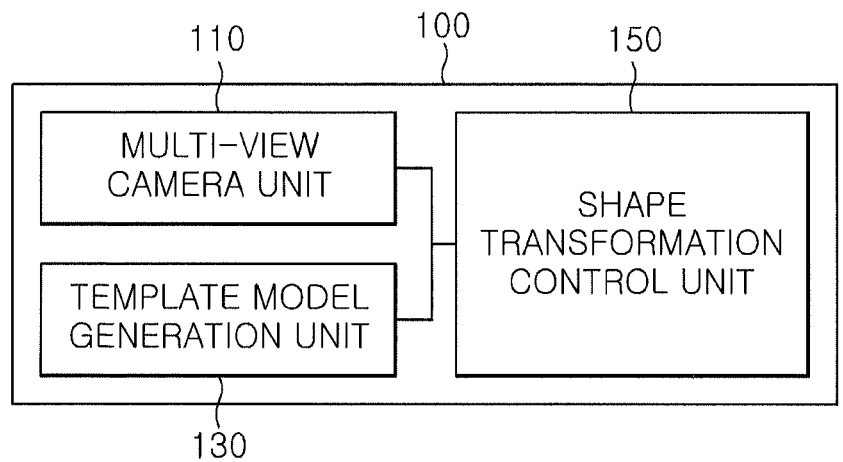
FIG. 1 is a view illustrating the configuration of a shape transformation apparatus according to an embodiment of the present invention.

The present invention will be described in detail with reference to the accompanying drawings below. Here, when the description is repetitive and detailed descriptions of well-known functions or configurations would unnecessarily obscure the gist of the present invention, the detailed descriptions will be omitted. The embodiments of the present invention are provided to complete the explanation for those skilled in the art the present invention. Therefore, the shapes and sizes of components in the drawings may be exaggerated to provide a more exact description.

A 3D model shape transformation apparatus and method according to an embodiment of the present invention will be described with reference to the accompanying drawings below.

First, the 3D model shape transformation apparatus according to an embodiment of the present invention will be described with reference to FIG. 1.

FIG. 1 is a view illustrating the configuration of a shape transformation apparatus according to the embodiment of the present invention.

As shown in FIG. 1, a shape transformation apparatus 100 includes a multi-view camera unit 110, a template model generation unit 130, and a shape transformation control unit 150.

The multi-view camera unit 110 obtains a plurality of 2D images by capturing an object using camera angles which are different from each other. Here, the multi-view camera unit 110 can generate the multi-view images or multi-view stereo images of an object in which the appearance and motion of the single frame of the object is captured using a multi-view camera.

The template model generation unit 130 generates a template model having a skeleton structure based on a previously given 3D mesh model.

The shape transformation control unit 150 generates a 3D volume model corresponding to the shape of the object using the plurality of 2D images obtained by the multi-view camera unit 110, and then transforms the shape of the template model based on the shape of the 3D volume model.

Next, the template model generation unit according to the embodiment of the present invention will be described with reference to FIG. 2.

Figure 2:
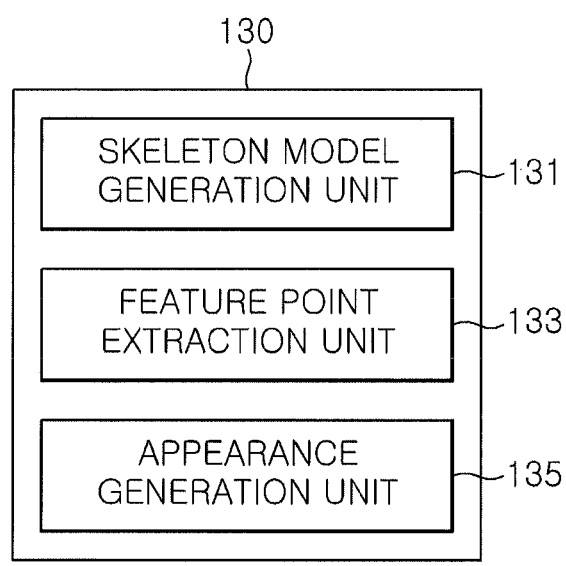
FIG. 2 is a view illustrating the configuration of a template model generation unit according to the embodiment of the present invention.

FIG. 2 is a view illustrating the configuration of the template model generation unit according to the embodiment of the present invention.

As shown in FIG. 2, the template model generation unit 130 includes a skeleton model generation unit 131, a feature point extraction unit 133, and an appearance generation unit 135.

The skeleton model generation unit 131 generates a 3D skeleton model by generating the skeletons of the 3D mesh model based on skeleton structure information. Here, the 3D skeleton model includes a plurality of skeletons and a plurality of joints.

The feature point extraction unit 133 extracts feature points which express the feature of the appearance of the 3D skeleton model.

The appearance modification unit 135 generates a template model based on the Non-Uniform Rational B-Spline (NURBS) surface by transforming the appearance of the 3D skeleton model based on the NURBS surface in terms of each of the extracted feature points.

Next, the template model according to the embodiment of the present invention will be described with reference to FIG. 3.

Figure 3:
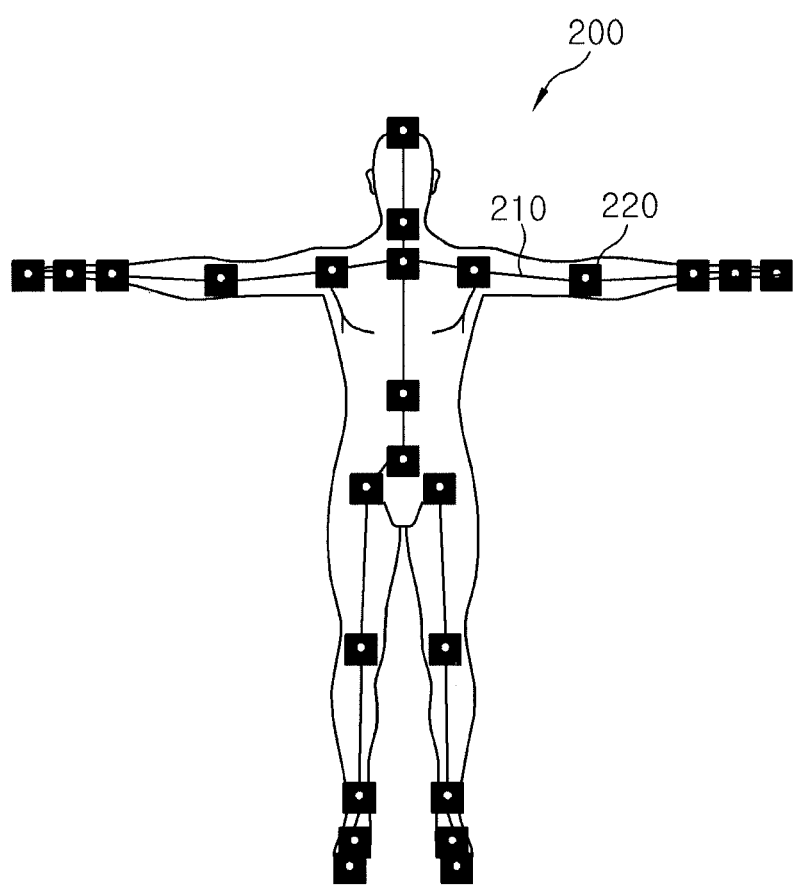
FIG. 3 is a view illustrating the skeleton structure of a template model according to the embodiment of the present invention.

FIG. 3 is a view illustrating the skeleton structure of the template model according to the embodiment of the present invention.

As shown in FIG. 3, the template model 200 includes skeletons 210 and joints 220 which form a skeleton structure.

Such a skeleton 210 is connected to an adjacent skeleton using such a joint 220.

The joint 220 connects adjacent skeletons.

Next, the shape transformation control unit according to the embodiment of the present invention will be described with reference to FIG. 4.

Figure 4:
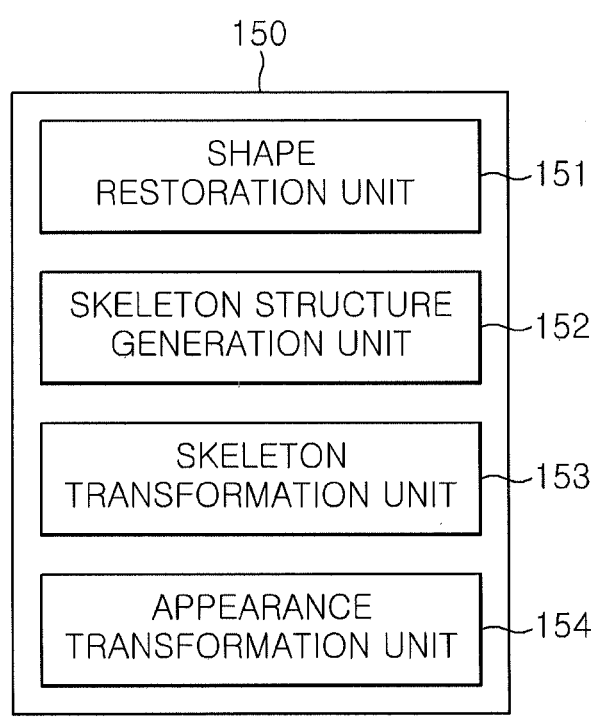
FIG. 4 is a view illustrating the configuration of a shape transformation control unit according to the embodiment of the present invention.

FIG. 4 illustrates the configuration of the shape transformation control unit according to the embodiment of the present invention.

As shown in FIG. 4, the shape transformation control unit 150 includes a shape restoration unit 151, a skeleton structure generation unit 152, a skeleton transformation unit 153, and an appearance transformation unit 154.

The shape restoration unit 151 generates the 3D volume model in which the shape of an object is restored using the plurality of 2D images of the object which were received from the multi-view camera unit 110.

The skeleton structure generation unit 152 generates the skeleton structure of the 3D volume model.

The skeleton transformation unit 153 transforms the skeleton structure of the template model based on the size and posture of the 3D volume model by matching the skeleton structure of the template model with the skeleton structure of the 3D volume model.

The appearance transformation unit 154 transforms the appearance of the template model based on the appearance of the 3D volume model by matching the appearance of the template model with the appearance of the 3D volume model.

Next, a method of generating a template model using the template model generation unit according to the embodiment of the present invention will be described with reference to FIG. 5.

Figure 5:
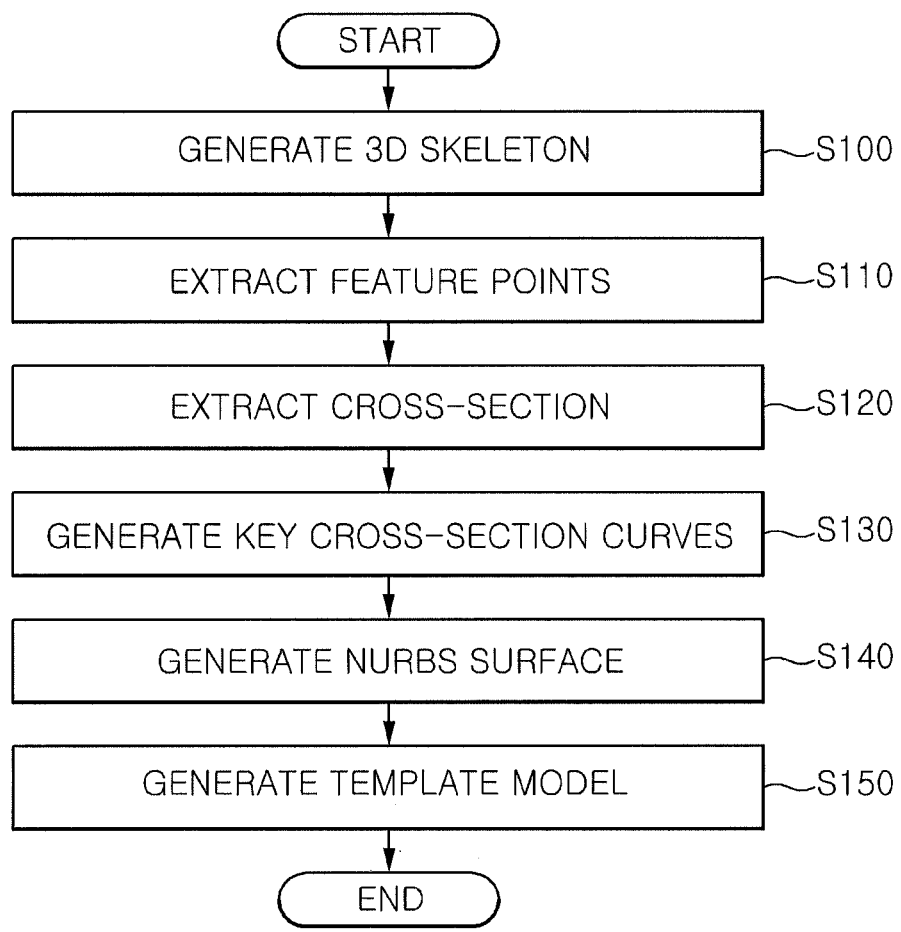
FIG. 5 is a view illustrating a template model generation method according to an embodiment of the present invention.

FIG. 5 is a view illustrating the template model generation method according to the embodiment of the present invention.

As shown in FIG. 5, first, the skeleton model generation unit 131 generates a 3D skeleton model having a skeleton structure by generating skeletons and joints for a previously given 3D mesh model based on previously given information about the skeleton structure at step S100.

Next, the feature point extraction unit 133 extracts feature points from the 3D skeleton model at step S110. Here, the feature point extraction unit 133 may extract a plurality of feature points from the 3D skeleton model.

Thereafter, the appearance modification unit 135 extracts cross-sections corresponding to the locations of the feature points from the 3D skeleton model at step S120. Here, the appearance modification unit 135 may extract a plurality of cross-sections corresponding to the respective locations of the plurality of feature points from the 3D skeleton model. Here, the appearance modification unit 135 may extract cross-sections each of which is formed of a plurality of vertices.

Thereafter, the appearance modification unit 135 generates key cross-section curves each of which is formed with a plurality of key vertexes by extracting the plurality of key vertices, which have the same distance to the center point of the relevant cross-section, from among the plurality of vertices which form the relevant cross-section at step S130. Here, the appearance modification unit 135 may generate a plurality of key cross-section curves corresponding to each of the plurality of cross-sections.

Next, the appearance modification unit 135 generates NURBS surfaces by performing B-spline interpolation on the key cross-section curves at step S140. Here, the appearance modification unit 135 may generate a plurality of NURBS surfaces, each of which corresponds to a plurality of key cross-section curves, by performing B-spline interpolation on each of the plurality of key cross-section curves.

Thereafter, the appearance modification unit 135 generates a template model by transforming the appearance of the 3D skeleton model based on the NURBS surfaces at step S150. Here, the appearance modification unit 135 may transform the appearance of the 3D skeleton model based on the plurality of NURBS surfaces.

Here, the template model generation unit 130 may set the subordinate relationship between each of the NURBS surfaces and the displacement of each of the vertices of the input mesh model.

The template model based on the NURBS surface, generated as described above, may transform the appearance of the model naturally and realistically using a u-direction curve generated in such a way as to perform B-spline interpolation on key vertexes corresponding to each of the key cross-section curves, using a uv-map generated in the v-direction, using the height parameters of each of the knot vectors of the muscle surface of each part when a specific pose is taken, for example, folded, swollen and projected, and using a weighted-sum between the displacements of key vertexes.

Next, a method of transforming the shape of a 3D model using the shape transformation apparatus according to the embodiment of the present invention will be described with reference to FIG. 6.

Figure 6:
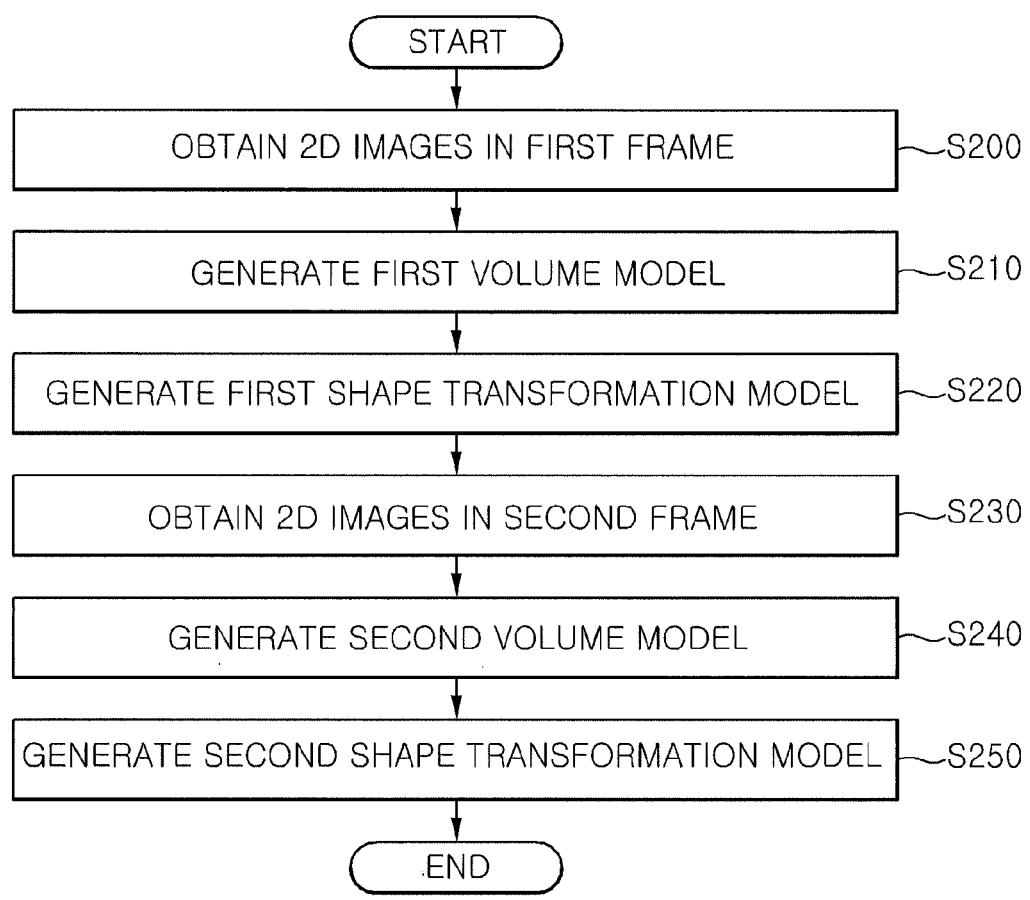
FIG. 6 is a view illustrating a shape transformation method according to an embodiment of the present invention.

FIG. 6 is a view illustrating the shape transformation method according to the embodiment of the present invention.

As shown in FIG. 6, first, the multi-view camera unit 110 obtains a plurality of 2D images in a first frame by capturing an object using camera angles which are different from each other at step S200.

Next, the shape restoration unit 151 of the shape transformation control unit 150 generates a first volume model, in which the shape of the object is restored, in the first frame using the plurality of 2D images obtained in the first frame at step S210. Here, the shape restoration unit 151 may generate the first volume model after extracting the foreground corresponding to the region of the object from the plurality of 2D images obtained in the first frame.

Thereafter, shape transformation control unit 150 generates a first shape transformation model obtained by transforming the shape of the template model using the first volume model at step S220.

Next, the multi-view camera unit 110 obtains the plurality of 2D images by capturing the object using camera angles which are different from each other in a second frame at step S230.

Thereafter, the shape restoration unit 151 of the shape transformation control unit 150 generates a second volume model in which the shape of the object is restored in the second frame using a plurality of 2D images obtained in the second frame at step S240. Here, the shape restoration unit 151 may generate the second volume model after extracting the foreground corresponding to the region of the object from the plurality of 2D images obtained from the second frame.

Thereafter, the shape transformation control unit 150 generates a second shape transformation model in which the shape of the first shape transformation model is transformed using the second volume model at step S250.

Next, a method of generating the first shape transformation model using the shape transformation control unit according to the embodiment of the present invention will be described with reference to FIG. 7.

Figure 7:
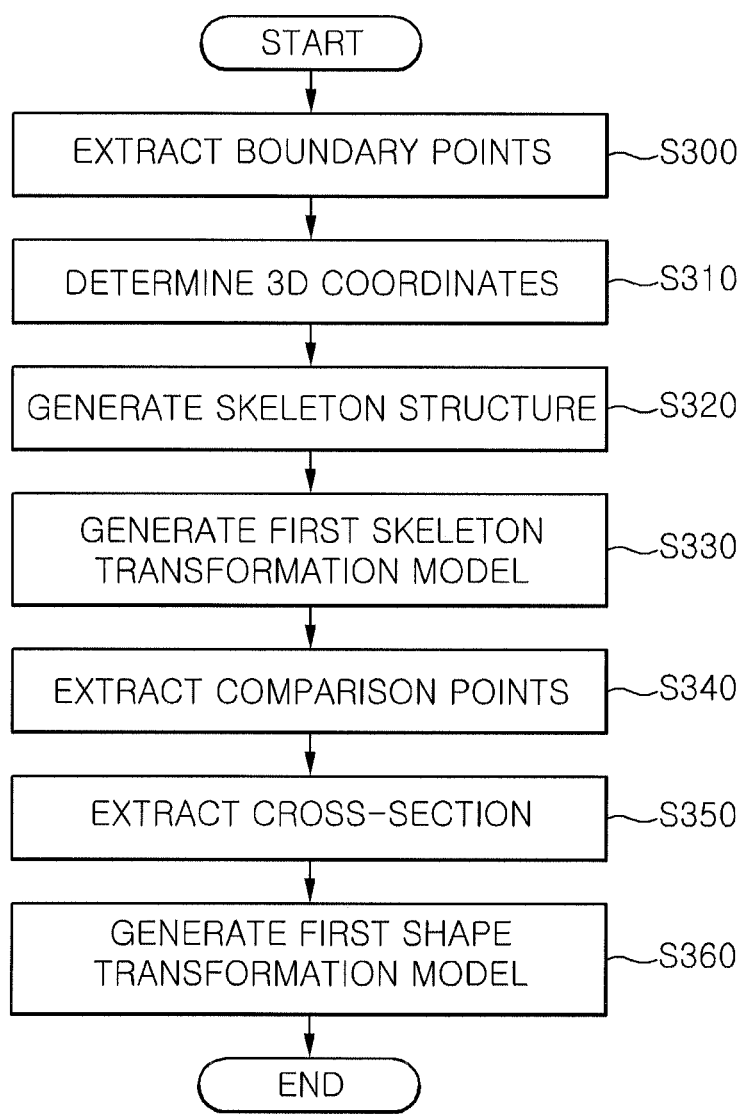
FIG. 7 is a view illustrating a first shape transformation model generation method according to an embodiment of the present invention.

FIG. 7 is a view illustrating the first shape transformation model generation method according to the embodiment of the present invention.

As shown in FIG. 7, first, the skeleton structure generation unit 152 extracts boundary points between the portions of the body of the object from the plurality of 2D images obtained in the first frame at step S300. Here, the skeleton structure generation unit 152 may extract boundary points between the portions of the body of the object, such as the head, neck, arms, legs or waist, from the plurality of 2D images obtained in the first frame. Further, the skeleton structure generation unit 152 may extract boundary points between the portions of the body of the object from front images and side images from among the plurality of 2D images.

Thereafter, the skeleton structure generation unit 152 determines 3D coordinates of each of the boundary points of the first volume model by performing 2D-to-3D linear mapping on the plurality of 2D images, which were obtained in the first frame, and the first volume model at step S310.

Next, the skeleton structure generation unit 152 generates the skeleton structure of the first volume model by determining the 3D coordinates of each of the joints of the first volume model based on the 3D coordinates of each of the boundary points of the first volume model at step S320. Here, the skeleton structure of the first volume model is used to determine the size and posture of the first volume model. Here, since boundary points between the portions of the body are close to a relevant joint, the skeleton structure generation unit 152 may determine the 3D coordinates of each of the joints of the first volume model based on the 3D coordinates of each of the boundary points of the first volume model.

Thereafter, the skeleton transformation unit 153 generates a first skeleton transformation model by transforming the skeleton structure of the template model into the skeleton structure of the first volume model in order to match the size and posture of the template model with the size and posture of the first volume model at step S330. Here, the skeleton transformation unit 153 may transform the skeleton structure of the template model into the skeleton structure of the first volume model by matching the coordinates of each of the joints of the template model with the coordinates of each of the joints of the first volume model.

Next, the appearance transformation unit 154 extracts comparison points corresponding to the feature points of the first skeleton transformation model from the first volume model at step S340. Here, the appearance transformation unit 154 may extract a plurality of comparison points corresponding to the plurality of feature points of the first skeleton transformation model from the first volume model.

Thereafter, the appearance transformation unit 154 extracts the cross-section of each of the comparison points from the first volume model at step S350. Here, the appearance transformation unit 154 may extract the cross-section of each of the plurality of comparison points from the first volume model.

Next, the appearance transformation unit 154 generates a first shape transformation model by transforming the appearance of the first skeleton transformation model based on the cross-section of each of the plurality of comparison points extracted from the first volume model in order to match the appearance of the first skeleton transformation model with the appearance of the first volume model at step S360. Here, the appearance transformation unit 154 may transform the appearance of the first skeleton transformation model by matching the cross-section of each of the plurality of feature points of the first skeleton transformation model with the cross-section of the plurality of comparison points of the first volume model.

Next, a method of generating the second shape transformation model using the shape transformation control unit according to the embodiment of the present invention will be described with reference to FIG. 8.

Figure 8:
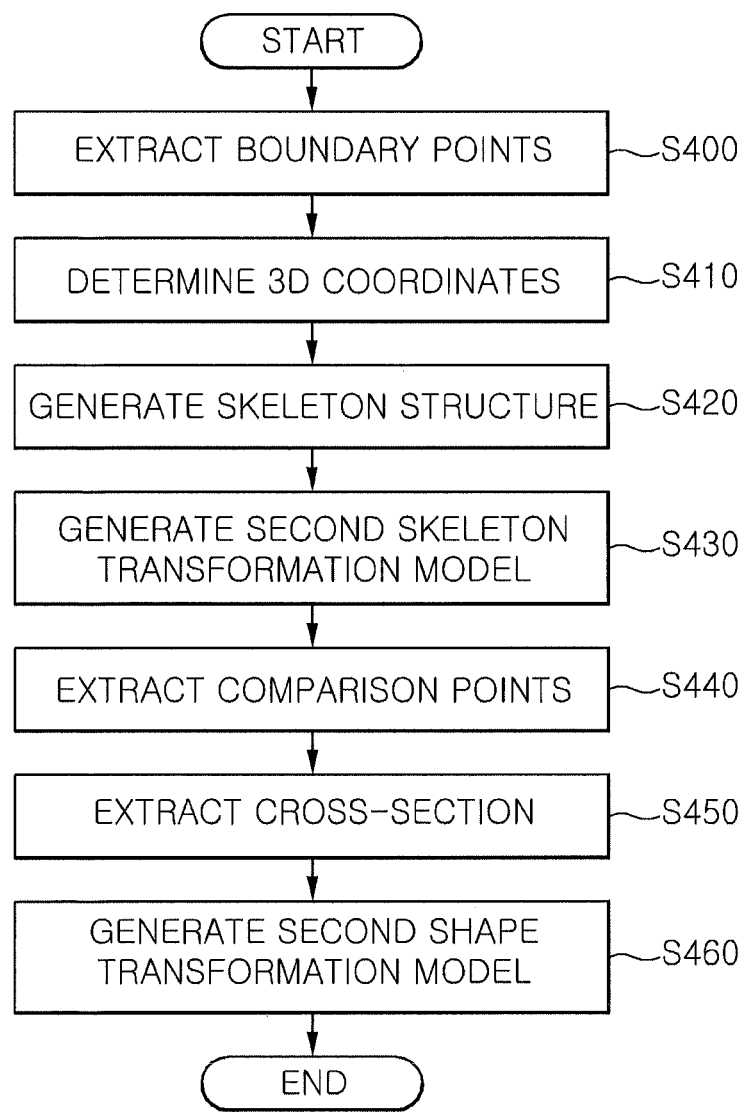
FIG. 8 is a view illustrating a second shape transformation model generation method according to an embodiment of the present invention.

FIG. 8 is a view illustrating the second shape transformation model generation method according to the embodiment of the present invention.

As shown in FIG. 8, first, the skeleton structure generation unit 152 extracts boundary points between the portions of the body of the object from the plurality of 2D images obtained in the second frame at step S400. Here, the skeleton structure generation unit 152 may extract boundary points between the portions of the body of the object, such as the head, neck, arms, legs or waist, from the plurality of 2D images obtained in the second frame. Further, the skeleton structure generation unit 152 may extract boundary points between the portions of the body of the object from front images and side images from among the plurality of 2D images.

Thereafter, the skeleton structure generation unit 152 determines 3D coordinates of each of the boundary points of the second volume model by performing 2D-to-3D linear mapping on the plurality of 2D images, which were obtained in the second frame, and the second volume model at step S410.

Next, the skeleton structure generation unit 152 generates the skeleton structure of the second volume model by determining the 3D coordinates of each of the joints of the second volume model based on the 3D coordinates of each of the boundary points of the second volume model at step S420. Here, the skeleton structure of the second volume model is used to determine the posture of the second volume model. Here, since boundary points between the portions of the body are close to a relevant joint, the skeleton structure generation unit 152 may determine the 3D coordinates of each of the joints of the second volume model based on the 3D coordinates of each of the boundary points of the second volume model.

Thereafter, the skeleton transformation unit 153 generates a second skeleton transformation model by transforming the skeleton structure of the first shape transformation model into the skeleton structure of the second volume model in order to match the posture of the first shape transformation model with the posture of the second volume model at step S430. Here, the skeleton transformation unit 153 may transform the skeleton structure of the first shape transformation model into the skeleton structure of the second volume model by matching the coordinates of each of the joints of the first shape transformation model with the coordinates of each of the joints of the second volume model.

Next, the appearance transformation unit 154 extracts comparison points corresponding to the feature points of the second skeleton transformation model from the second volume model at step S440. Here, the appearance transformation unit 154 may extract a plurality of comparison points corresponding to the plurality of feature points of the second skeleton transformation model from the second volume model.

Thereafter, the appearance transformation unit 154 extracts the cross-section of each of the comparison points from the second volume model at step S450. Here, the appearance transformation unit 154 may extract the cross-section of each of the plurality of comparison points from the second volume model.

Next, the appearance transformation unit 154 generates a second shape transformation model by transforming the appearance of the second skeleton transformation model based on the cross-section of each of the plurality of comparison points extracted from the second volume model in order to match the appearance of the second skeleton transformation model with the appearance of the second volume model at step S460. Here, the appearance transformation unit 154 may transform the appearance of the second skeleton transformation model by matching the cross-section of each of the plurality of feature points of the second skeleton transformation model with the cross-section of the plurality of comparison points of the second volume model.

Next, a method of extracting boundary points between the portions of a body from 2D images according to an embodiment of the present invention will be described with reference to FIG. 9.

Figure 9:
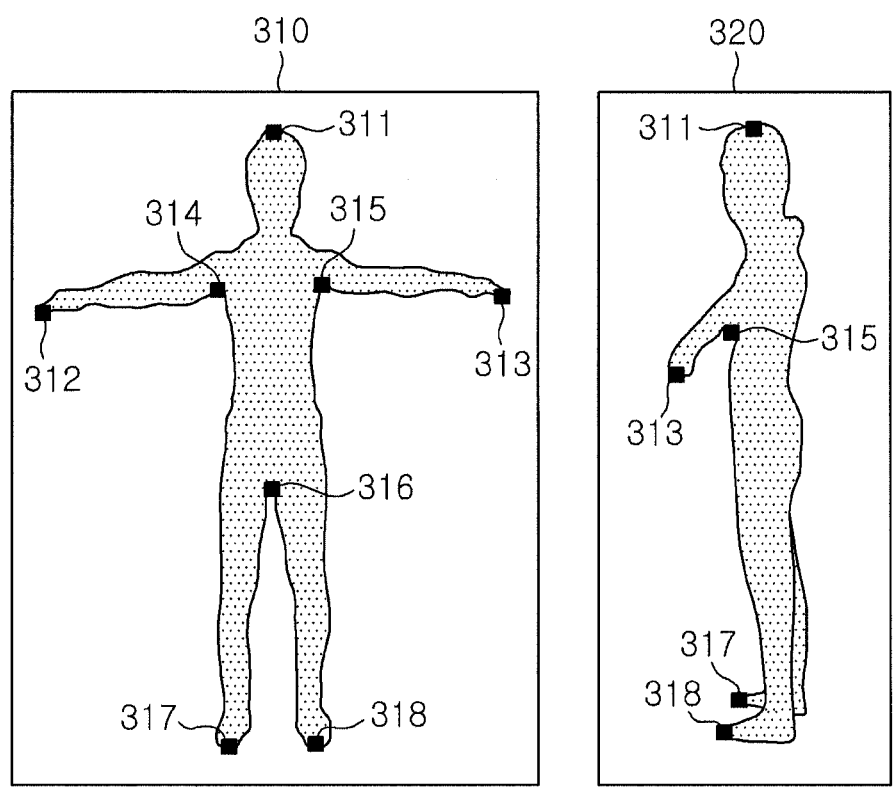
FIG. 9 is a view illustrating 2D images according to an embodiment of the present invention.

FIG. 9 is a view illustrating 2D images according to the embodiment of the present invention.

As shown in FIG. 9, the skeleton structure generation unit 152 may extract a plurality of boundary points from a front view 310.

The skeleton structure generation unit 152 may extract a first boundary point 311, which indicates the top of a head, from the front view 310.

The skeleton structure generation unit 152 may extract a second boundary point 312 and a third boundary point 313, which indicate the ends of both hands, from the front view 310.

The skeleton structure generation unit 152 may extract a fourth boundary point 314 and a fifth boundary point 315, which indicate the boundaries between both arms and the body, from the front view 310.

The skeleton structure generation unit 152 may extract a sixth boundary point 316, which indicates the boundary between both legs, from the front view 310.

The skeleton structure generation unit 152 may extract a seventh boundary point 317 and an eighth boundary point 318, which indicate the ends of both feet, from the front view 310.

The skeleton structure generation unit 152 may extract the plurality of boundary points from a side view 320.

The skeleton structure generation unit 152 may extract the first boundary point 311, which indicates the top of a head, from the side view 320.

The skeleton structure generation unit 152 may extract the third boundary point 313, which indicate the end of one hand, from the side view 320.

The skeleton structure generation unit 152 may extract the fifth boundary point 315, which indicate the boundary between one arm and the body, from the side view 320.

The skeleton structure generation unit 152 may extract the seventh boundary point 317 and the eighth boundary point 318, which indicate the respective ends of both feet, from the side view 320.

Next, comparison points extracted from a 3D volume model according to an embodiment of the present invention will be described with reference to FIG. 10.

Figure 10:
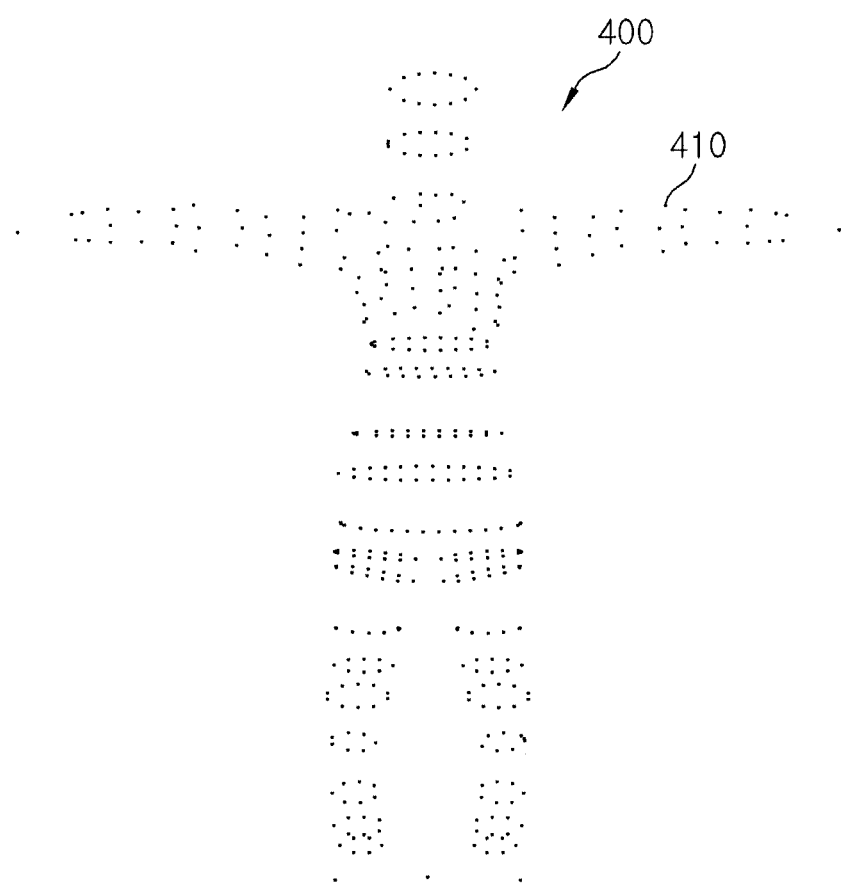
FIG. 10 is a view illustrating the comparison points of a 3D volume model according to an embodiment of the present invention.

FIG. 10 is a view illustrating the comparison points of a 3D volume model according to the embodiment of the present invention.

As shown in FIG. 10, the shape transformation apparatus 100 may extract feature points 410 indicative of the feature of the appearance of a 3D volume model 400.

Here, the shape transformation apparatus 100 may extract representative feature points from among the feature points extracted from the 3D volume model 400.

Next, the NURBS surfaces of a template model according to an embodiment of the present invention will be described with reference to FIG. 11.

Figure 11:
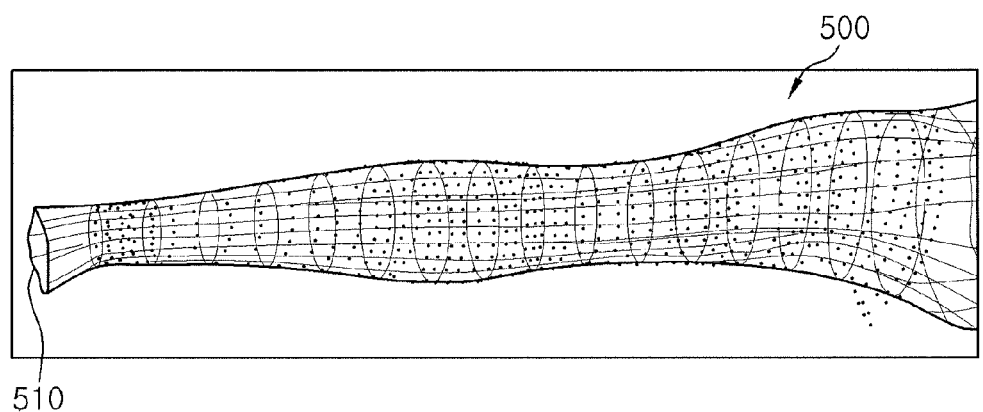
FIG. 11 is a view illustrating an NURBS surface according to an embodiment of the present invention.

FIG. 11 is a view illustrating NURBS surfaced according to the embodiment of the present invention.

As shown in FIG. 11, the appearance of a template model 500 is formed based on NURBS surfaces 510.

Here, the transformation apparatus 100 determines the displacement of each of the NURBS surfaces 510 in order to match the appearance of the template model 500 with the appearance of an object.

Therefore, the shape transformation apparatus 100 may express minute changes of the object, such as muscles and wrinkles, using the NURBS surfaces 510 of the template model 500.

According to the feature of the present invention, there is an advantage of generating a 3D model which can express the appearance and motion of an object using only information about the appearance of the object. Further, since a 3D model corresponding to the shape of an object is generated by transforming the shape of a previously generated template model, there is an advantage of reducing the calculation time that is required to express the motion of the object.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A 3-dimensional (3D) model shape transformation method, comprising:
generating a volume model, in which a shape of an object is restored, based on a plurality of 2D images of the object;
generating a skeleton structure of the volume model using boundary points between portions of a body of the volume model;
generating a skeleton transformation model by transforming a skeleton structure of a template model into the skeleton structure of the volume model in order to match a size and a posture of the template model with a size and a posture of the volume model;
generating a shape transformation model corresponding to the shape of the object by transforming appearance of the skeleton transformation model based on cross-sections of the volume model in order to match appearance of the skeleton transformation model with appearance of the volume model; and
generating the template model before generating the volume model,
wherein the generating the template model comprises:
generating a 3D skeleton model by forming a skeleton structure of a 3D mesh model; and
generating the template model by transforming appearance of the 3D skeleton model based on each of relevant Non-Uniform Rational B-Spline (NURBS) surfaces,
wherein the generating the template model by transforming the appearance of the 3D skeleton model comprises:
extracting a cross-section of a predetermined location of the 3D skeleton model; and
generating the NURBS surface by performing interpolation on the cross-section of a predetermined location of the 3D skeleton model,
wherein the generating the shape transformation model comprises generating the shape transformation model by matching a cross-section of a predetermined location of the skeleton transformation model with a cross-section of the volume model.

2. The 3D model shape transformation method as set forth in claim 1, wherein the generating the skeleton structure of the volume model comprises generating the skeleton structure of the volume model using coordinates of each of joints of the volume model, which were determined based on the boundary points.

3. The 3D model shape transformation method as set forth in claim 2, wherein the generating the skeleton structure of the volume model comprises:
determining coordinates of each of the boundary points; and
determining the coordinates of each of the joints of the volume model based on the coordinates of each of the boundary points.

4. The 3D model shape transformation method as set forth in claim 2, wherein the generating the skeleton transformation model comprises transforming the skeleton structure of the template model into the skeleton structure of the volume model by matching coordinates of each of joints of the template model with the coordinates of each of the joints of the volume model.

5. The 3D model shape transformation method as set forth in claim 1, wherein the generating the NURBS surface comprises:
generating key cross-section curves using a plurality of vertices which are at a same distance away from a center point of the cross-section of a predetermined location of the 3D skeleton model; and
generating the NURBS surface by performing interpolation on the key cross-section curves.

6. A 3D model shape transformation apparatus, comprising:
a camera to obtain a plurality of 2D images in a single frame by capturing a shape of an object; and
at least one processor configured to:
generate a 3D volume model by restoring the shape of the object based on the plurality of 2D images;
generate a skeleton structure of the 3D volume model;
transform a size and a posture of the 3D volume model into those of a template model by matching a skeleton structure of the template model with the skeleton structure of the 3D volume model;
generate the template model before the volume model; and
transform appearance of the 3D volume model into that of the template model by matching a cross-section of a predetermined location of the template model with a relevant cross-section of the 3D volume model,
wherein the generate the template model comprises:
generating a 3D skeleton model by forming a skeleton structure of a 3D mesh model; and
generating the template model by transforming appearance of the 3D skeleton model based on each of relevant Non-Uniform Rational B-Spline (NURBS) surfaces, wherein the generating the template model by transforming the appearance of the 3D skeleton model comprises:
extracting a cross-section of a predetermined location of the 3D skeleton model; and
generating the NURBS surface by performing interpolation on the cross-section of a predetermined location of the 3D skeleton model.

7. The 3D model shape transformation apparatus as set forth in claim 6, wherein the at least one processor is further configured to determine coordinates of each of joints of the 3D volume model using boundary points of portions of a body of the 3D volume model, and generating the skeleton structure of the 3D volume model based on the coordinates of each of the joints of the 3D volume model.

8. The 3D model shape transformation apparatus as set forth in claim 7, wherein the at least one processor is further configured to transform the size and the posture of the 3D volume model into those of the template model by matching coordinates of each of joints of the template model with the coordinates of each of the joints of the volume model.

9. The 3D model shape transformation apparatus as set forth in claim 6, wherein the at least one processor is further configured to:
generate a 3D skeleton model by forming a skeleton structure on a previously given 3D mesh model; and
generate the template model by extracting a cross-section of a predetermined location of the 3D skeleton model and transforming appearance of the 3D skeleton model based on each of NURBS surfaces corresponding to the extracted cross-section.

\* \* \* \* \*